Dec. 1, 1931.  W. C. ANDREWS  1,833,887
PISTON RING
Filed Dec. 3, 1930
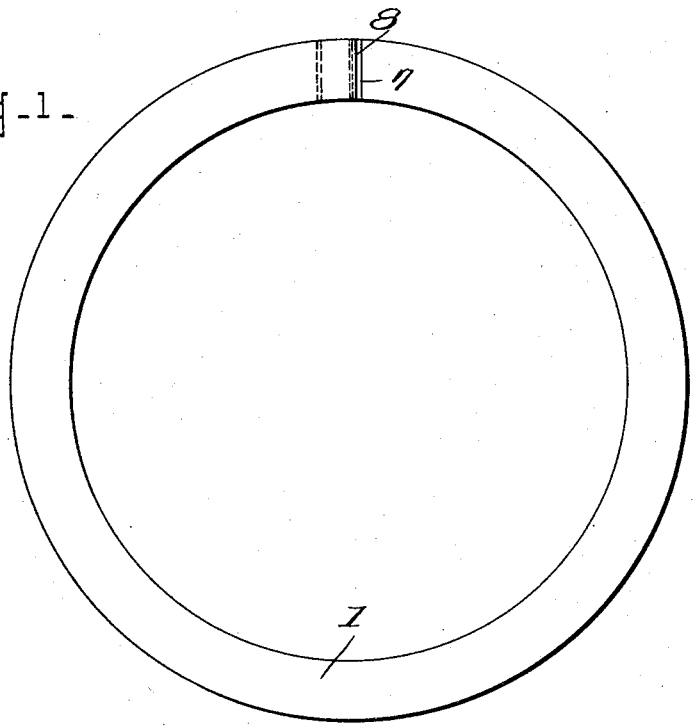
Fig-1-
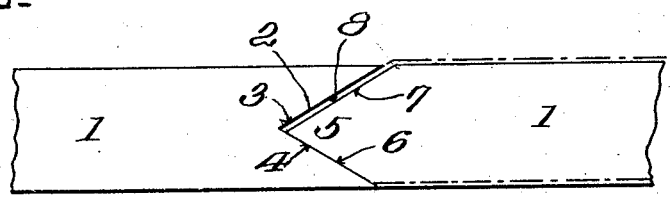
Fig-2-
INVENTOR.
W. C. Andrews
BY
ATTORNEY Patented Dec. 1, 1931　　　　　　　　　　　　　　　　　1,833,887

UNITED STATES PATENT OFFICE

WILLIAM C. ANDREWS, OF SILVER SPRING, MARYLAND

PISTON RING

Application filed December 3, 1930. Serial No. 499,835.

My invention relates to improvements in piston rings.

One object of my invention is to provide a piston ring in which the joint between the free ends thereof will absolutely prevent the passage of gases from back of the ring, by the ring and also prevent the pumping of oil to the cylinder head.

Another object of my invention is to provide a piston ring in which the joint between the free ends of the ring will effectively seal all passage of gases or oil at all times, that is when the ring is cool and after it has become heated and expanded.

A further object of my invention is to provide a piston ring of this character which is simple in construction and cheaply manufactured and having certain details of structure hereinafter more fully described.

In the accompanying drawings:—

Figure 1 is a top plan view of my improved piston ring.

Figure 2 is a side elevation of Figure 1 partly broken away.

Referring now to the drawings:—

1 represents my improved piston ring which is made of any suitable metal and as is understood by those skilled in the art, fits in the grooves in the wall of the piston. These rings are of a width slightly less than the width of the grooves in the wall of the piston to allow for expansion thereof so that they will at all times have a free movement therein so that they will snugly engage the walls of the cylinder.

In my improved piston ring one end of the body portion 1 is provided with a horizontal transverse cut 2, the walls 3 and 4 of which are of equal length. While I have shown these walls as arranged at an angle greater than 45 degrees, it will be understood that the same can be arranged at any desired angle without departing from my invention.

The opposite end of the body portion 1 is provided with a horizontal transverse V-shaped projection 5, having the two walls 6 and 7 arranged at the same angle as the walls 3 and 4 of the transverse cut 2. The wall 6 of the projection 5 as clearly shown in Figure 2 of the drawings is shorter than the wall 7 whereby there is a space 8 left between wall 7 of the projection 5 and wall 3 of the cut 2. This arrangement of walls insures that the walls 4 of the cut 2 and wall 6 of the projection 5 will closely engage at all times and thus form a perfect seal to prevent the outward escape of gases that work their way in the ring grooves of the piston back of the piston rings.

By this arrangement of walls it will be seen, that upon the expansion of the ring circumferentially, the wall 6 rides up upon the wall 4 of the cut and the ring assumes the position shown in dotted lines of Figure 2, there being sufficient space in the ring grooves to allow the ring to assume this position.

Having thus fully described my invention, what I claim is:—

1. A piston ring, comprising a body portion having a transverse V-shaped cut in one end and the other end having a V-shaped projection adapted to enter said cut and the walls of the V-shaped cut and projection so constructed that but one wall thereof will engage.

2. A piston ring, comprising a body portion having a transverse V-shaped cut in one end and the other end having a V-shaped projection provided with walls of different length.

3. A piston ring, comprising a body portion having a transverse V-shaped cut in one end and the other end of the body portion having a V-shaped projection having walls of unequal length and adapted to extend into the transverse V-shaped cut.

4. A piston ring, comprising a body portion having a transverse V-shaped cut in one end of the walls which are of equal length and the other end of the body portion having a V-shaped projection having walls of unequal length and adapted to extend with the transverse V-shaped cut.

5. A piston ring, comprising a body portion having a horizontal transverse V-shaped cut in one end, the walls of which are of equal length and the other end of the body portion having a V-shaped projection having walls of unequal length and adapted to extend into the transverse V-shaped cut.

6. A piston ring comprising a body portion having a transverse V-shaped cut in one end and the end having a V-shaped projection adapted to enter said cut and the walls of either cut or projection being of different length.

7. A piston ring comprising a body portion having a transverse cut in one end and the other end having a projection provided with walls of different lengths.

8. A piston ring comprising a body portion having a transverse cut in one end and the other end having a correspondingly shaped projection adapted to enter said cut and the walls of the cut and projection so constructed that but one wall thereof will engage.

9. A piston ring comprising a body portion having a transverse cut in one end and the other end having a correspondingly shaped projection adapted to enter said cut and the walls of either the cut or projection being of different lengths.

In testimony whereof, I have signed this application.

WILLIAM C. ANDREWS.